US010233909B2

(12) United States Patent
Ehrnberg (10) Patent No.: US 10,233,909 B2
(45) Date of Patent: Mar. 19, 2019

(54) FLOATING WIND ENERGY HARVESTING APPARATUS WITH IMPROVED MAINTENANCE (71) Applicant: SeaTwirl AB, Göteborg (SE)

(72) Inventor: Daniel Ehrnberg, Steninge (SE)

(73) Assignee: SEATWIRL AB, Göteborg (SE)

( * ) Notice: Subject to any disclaimer, the term of this patent is extended or adjusted under 35 U.S.C. 154(b) by 0 days.

(21) Appl. No.: 15/735,779

(22) PCT Filed: Jun. 27, 2016

(86) PCT No.: PCT/SE2016/050635
§ 371 (c)(1),
(2) Date: Dec. 12, 2017

(87) PCT Pub. No.: WO2017/003355
PCT Pub. Date: Jan. 5, 2017

(65) Prior Publication Data
US 2018/0171986 A1 Jun. 21, 2018

(30) Foreign Application Priority Data
Jul. 2, 2015 (SE) .................................. 1550937

(51) Int. Cl.
F03D 80/50 (2016.01)
H02K 7/102 (2006.01)
(Continued)

(52) U.S. Cl.
CPC ............... F03D 80/50 (2016.05); B63B 9/00 (2013.01); B63B 35/003 (2013.01); B63B 35/44 (2013.01);
(Continued)

(58) Field of Classification Search
CPC . F03D 80/50; F03D 9/25; F03D 13/25; F03D 3/005
See application file for complete search history.

(56) References Cited

U.S. PATENT DOCUMENTS

2008/0050237 A1* 2/2008 Lee .................... F03D 3/005
416/197 A
2009/0140528 A1* 6/2009 Ireland .................. F03D 3/065
290/55
(Continued)

FOREIGN PATENT DOCUMENTS

EP 2 080 899 7/2009
EP 2 716 908 4/2014
(Continued)

OTHER PUBLICATIONS

International Search Report from PCT/SE2016/050635, dated Oct. 21, 2016.
(Continued)

Primary Examiner — Sean Gugger
(74) Attorney, Agent, or Firm — Westman, Champlin & Koehler, P.A.

(57) ABSTRACT

A floating VAWT comprising a wind turbine body having a lower body portion and an upper body portion; at least one blade attached to the upper body portion for converting wind energy to rotation of the wind turbine body; and an energy converter attached to the wind turbine body for converting the rotation of the wind turbine body to electrical energy. The energy converter comprises a first energy converter part, and a second energy converter part to be kept relatively stationary in relation to the first energy converter part. The energy converter is attached to the wind turbine body by means of a first releasable mechanical coupling between the first energy converter part and the lower body portion of the wind turbine body, and a second releasable mechanical (Continued)

coupling between the first energy converter part and the upper body portion of the wind turbine body.

13 Claims, 6 Drawing Sheets

(51) Int. Cl.
| | | |
|---|---|---|
| H02K 7/18 | (2006.01) | |
| F03D 13/25 | (2016.01) | |
| F03D 3/00 | (2006.01) | |
| B63B 35/00 | (2006.01) | |
| F03D 9/25 | (2016.01) | |
| B63B 9/00 | (2006.01) | |
| B63B 35/44 | (2006.01) | |

(52) U.S. Cl.
CPC .............. *F03D 3/005* (2013.01); *F03D 9/25* (2016.05); *F03D 13/25* (2016.05); *H02K 7/102* (2013.01); *H02K 7/18* (2013.01); *H02K 7/183* (2013.01); *B63B 2009/008* (2013.01); *B63B 2035/446* (2013.01); *F05B 2220/706* (2013.01); *F05B 2230/6102* (2013.01); *F05B 2230/80* (2013.01); *F05B 2240/95* (2013.01); *Y02E 10/727* (2013.01); *Y02E 10/74* (2013.01); *Y02P 70/523* (2015.11)

(56) References Cited

U.S. PATENT DOCUMENTS

| | | | | |
|---|---|---|---|---|
| 2010/0230965 A1* | 9/2010 | Pitre | .................... | F03B 13/186 290/42 |
| 2010/0232965 A1* | 9/2010 | Chang | .................... | F03D 3/064 416/169 R |
| 2010/0253084 A1 | 10/2010 | Lin et al. | | |
| 2011/0018280 A1* | 1/2011 | Mahaffy | ................. | F03D 3/005 290/55 |
| 2011/0115232 A1* | 5/2011 | vanderDeen | ............ | F03D 3/005 290/55 |
| 2011/0133474 A1* | 6/2011 | Haar | ........................ | F03D 3/06 290/55 |
| 2013/0152840 A1* | 6/2013 | Awashima | ............ | B63B 35/003 114/125 |
| 2014/0186183 A1* | 7/2014 | Mogensen | ............. | B65G 37/00 416/170 R |
| 2014/0327244 A1* | 11/2014 | Angoli | .................... | F03D 9/007 290/55 |
| 2016/0298605 A1* | 10/2016 | Brendle | .................... | F03D 7/06 |

FOREIGN PATENT DOCUMENTS

| | | |
|---|---|---|
| JP | 2013-029101 | 2/2013 |
| NL | 1035026 | 8/2009 |
| WO | WO 2010120182 | 10/2010 |
| WO | WO 2011/008153 | 1/2011 |
| WO | WO 2012/058284 | 5/2012 |
| WO | WO 2013/092362 | 6/2013 |

OTHER PUBLICATIONS

"Darrieus Vertical Axis Wind Turbine for Power Generation I: Assessment of Darrieus VAWT Configurations" by W. Tjiu et al., Renewable Energy 75 (2015) 50-67.

* cited by examiner

FLOATING WIND ENERGY HARVESTING APPARATUS WITH IMPROVED MAINTENANCE

CROSS-REFERENCE TO RELATED APPLICATION

This Application is a Section 371 National Stage Application of International Application No. PCT/SE2016/050635, filed Jun. 27, 2016 and published as WO 2017/003355 on Jan. 5, 2017, in English, the contents of which are hereby incorporated by reference in their entirety.

FIELD OF THE INVENTION

The present invention relates to a floating wind energy harvesting apparatus for offshore installation, and to a maintenance method for the floating wind energy harvesting apparatus.

BACKGROUND OF THE INVENTION

Wind energy has long been known to be a clean and safe form of energy. Recently, the use of wind turbines for generating electricity has increased. Most of the generated electricity comes from land-based wind turbines.

However, it is sometimes difficult to find good locations on land for new wind turbines, and it is known that the wind at sea is stronger and more consistent than the wind over land. On the other hand, offshore wind turbines have to be able to withstand considerably harsher conditions and have so far been found to be more difficult and costly to install and to access for maintenance.

Therefore, much effort has been spent on developing wind turbines suitable for offshore use.

Since the establishment of reliable and cost-efficient wind turbine foundations in offshore locations in particular has been found to be a major challenge, one approach has been to develop floating wind turbines for offshore use.

A particularly interesting development is floating vertical axis wind turbines (VAWTs), in which the floating turbine body of the VAWT rotates in the water, effectively using the water as a kind of bearing.

This approach, which practically obviates the need for the above-mentioned costly and complicated building of wind turbine foundations and provides for a robust and relatively cost-efficient construction, is described in WO 2011/008153 and NL 1035026.

However, as for all offshore wind turbines, maintenance is still expected to be challenging, particularly for very large wind turbines.

Thus, there appears to be room for improvement. In particular, it would be desirable to provide for facilitated maintenance of a floating vertical axis wind turbine of the type described in WO 2011/008153 and NL 1035026.

SUMMARY

In view of the above-mentioned and other drawbacks of the prior art, it is an object of the present invention to provide an improved floating wind energy harvesting apparatus, and in particular to provide for facilitated maintenance of such a wind energy harvesting apparatus.

According to a first aspect of the present invention, it is therefore provided a floating wind energy harvesting apparatus for offshore installation, the wind energy harvesting apparatus comprising: an elongated wind turbine body extending along a longitudinal wind turbine body axis, the wind turbine body comprising a lower body portion to be mainly below a water surface when the wind energy harvesting apparatus is in operation and an upper body portion to be mainly above the water surface when the wind energy harvesting apparatus is in operation; at least one blade attached to the upper body portion for converting wind energy to rotation of the wind turbine body around the longitudinal wind turbine body axis; and an energy converter attached to the wind turbine body for converting the rotation of the wind turbine body to electrical energy, the energy converter comprising a first energy converter part coupled to the turbine body for rotating in response to rotation of the wind turbine body, and a second energy converter part to be kept relatively stationary in relation to the wind turbine body, the resulting rotation of the first energy converter part in relation to the second energy converter part being converted to electrical energy by the energy converter, wherein the energy converter is attached to the wind turbine body by means of a first releasable mechanical coupling between the first energy converter part and the lower body portion of the wind turbine body, and a second releasable mechanical coupling between the first energy converter part and the upper body portion of the wind turbine body.

It should be understood that each of the upper body portion and the lower body portion may in turn be formed from a plurality of portions, which may perform different functions. For instance, the lower body portion may comprise a buoyancy-providing portion and a ballast portion (a weight) for keeping the wind energy harvesting apparatus floating generally upright, with the longitudinal wind turbine body axis thus being generally vertical. Naturally, the action of wind and/or waves may typically cause the orientation of the longitudinal wind turbine body axis to fluctuate, and to deviate from the vertical direction.

Regarding the above-mentioned buoyancy-providing portion and ballast portion, these portions may advantageously be spaced apart as far as possible, to separate the center of buoyancy and center of mass. This arrangement provides for stable operation of the wind energy harvesting apparatus.

That the lower body portion is to be mainly below the water surface should be understood to mean that more than half of the length of the lower body portion is to be below the water surface. Analogously, more than half of the length of the upper body portion is to be above the water surface.

The upper body portion and the lower body portion may advantageously be rigidly connected via the first energy converter part, so that one revolution of the upper body portion results in one revolution of the lower body portion.

The energy converter may advantageously be a generator/motor, and one of the first energy converter part and the second energy converter part may comprise at least one magnet, and the other one of the first and second energy converter parts may comprise at least one coil, so that rotation of the first energy converter part in relation to the second energy converter part results in the conductor of the at least one coil moving through the magnetic field generated by the at least one magnet.

Advantageously, the first energy converter part may comprise the at least one magnet, and the second energy converter part may comprise the at least one coil, to facilitate conduction of electrical current from and to the energy converter. Alternatively, one or several generator/motors may be comprised in one of the first energy converter part and the second energy converter part, and may be driven (when in generator mode) by the relative rotation between the first and second energy converter parts. For example, one or several generator/motors may be attached to the second energy converter part and driven (when in generator mode) by a pinion on the first energy converter part.

An arm may be connected to the second energy converter part to allow mechanical coupling of the second energy converter part to an anchoring arrangement or a braking arrangement, in order to achieve the desired relative rotation between the first energy converter part and the second energy converter part.

The above-mentioned electrical current may be conducted from or to the energy converter in a conductor, which may extend along the above-mentioned arm.

Furthermore, the energy converter may comprise a control unit for controlling operation of the wind energy harvesting apparatus. For instance, the control unit may be configured to control the energy converter to alternate between functioning as a generator and functioning as a motor. In addition, the control unit may be configured to control one or several actuator(s), which may be arranged in the lower body portion and/or the upper body portion. To allow a control unit comprised in the energy converter to control operation of one or several actuator(s) arranged in the lower body portion and/or the upper body portion, the wind energy harvesting apparatus may further comprise a releasable electrical coupling for electrical signals between the energy converter and at least one of the lower body portion and upper body portion. Examples of possible actuators could be a pump provided in the lower body portion and blade pitch control actuators in the upper body portion for controlling a pitch of the at least one blade.

That the first and second mechanical couplings are releasable should be understood to mean that the first and second mechanical couplings can be disengaged and reengaged. For instance, each of the first and second mechanical couplings can be achieved using at least one removable and reusable fastener.

The present invention is based upon the realization that maintenance of the floating wind energy harvesting apparatus can be made easier and safer by collecting functionalities that are likely to need replacement and/or maintenance in a modular unit that can relatively easily be detached and removed from the rest of the apparatus on site. The present inventor has further realized that this can be achieved by providing a lower body portion and an upper body portion, and releasably mechanically coupling the upper and lower body portions via an energy converter, and in particular via a first energy converter part that rotates together with the lower and upper wind turbine body portions.

Embodiments of the present invention thus provide for simpler and safer maintenance of a floating wind energy harvesting apparatus of the VAWT type, in particular when the wind energy harvesting apparatus is very large. This in turn provides for a reduced cost per unit electrical energy produced over the life of the floating wind energy harvesting apparatus.

The floating wind energy harvesting apparatus according to embodiments of the present invention may advantageously be configured in such a way that the energy converter is arranged above the water surface when the wind energy harvesting apparatus is in operation.

This may, for instance, be achieved through suitable dimensioning of the lower and upper body portions. For example the above-mentioned buoyancy-providing portion and ballast portion that may be comprised in the lower body portion may be dimensioned in such a way that the energy converter is generally above the water surface. Naturally, the energy converter may intermittently be at least partly below the water surface, in particular in the case of large waves and strong winds.

This arrangement of the energy converter facilitates accessibility of the energy converter and reduces its exposure to sea water.

According to various embodiments, the upper body portion may comprise a first body flange; the lower body portion may comprise a second body flange; the first energy converter part may comprise a first energy converter flange and a second energy converter flange; and the first body flange may be releasably mechanically connected to the first energy converter flange, and the second body flange may be releasably mechanically connected to the second energy converter flange.

The flanges may be releasably connected to each other by means of suitable fasteners, such as bolts and nuts. Alternatively, the holes in one of the connected flanges may be threaded.

The interface between connected flanges may be planar to facilitate sliding the energy converter out from between the lower body portion and the upper body portion. Alternatively, at least one of the flange pairs may have corresponding grooves or tracks to improve the transfer of torque across the mechanical coupling formed by the flange pair.

For instance, the flange pair between the lower body portion and the energy converter may have a planar interface, and the flange pair between the upper body portion and the energy converter may have grooves and corresponding ridges fitting in the grooves to provide for a reliable transfer of torque from the upper body portion to the first energy converter part.

Generally, the first mechanical coupling and the second mechanical coupling may be configured in such a way that the energy converter is removable in a direction perpendicular to the longitudinal axis of the wind turbine body when the couplings are released.

According to various embodiments, at least one of the first body flange and the second body flange may comprise a first set of holes for releasable attachment of the energy converter to the wind turbine body; and a second set of holes for temporary releasable attachment of a wind turbine body holding arrangement to the wind turbine body between the first body flange and the second body flange.

The first set of holes may be arranged closer to the longitudinal axis of the wind turbine body than the second set of holes, to facilitate attachment of the wind turbine holding arrangement to the lower and upper wind turbine body portions while the energy converter is attached between the lower and upper body portions.

According to embodiments, furthermore, the energy converter may additionally comprise a braking arrangement mechanically coupled to the first energy converter part and to the second energy converter part; and processing circuitry for controlling the braking arrangement to reduce a rotational speed of the first energy converter part in relation to the second energy converter part. The processing circuitry may, for instance, be included in a control unit for controlling other functions of the floating wind energy harvesting apparatus.

According to a second aspect of the present invention, there is provided a method of replacing the energy converter of the floating wind energy harvesting apparatus according to various embodiments of the present invention, the method comprising the steps of: attaching a holding arrangement to the upper body portion and to the lower body portion, the holding arrangement being arranged and configured to maintain a relative arrangement of the upper body portion and the lower body portion; releasing the first releasable mechanical coupling and the second releasable mechanical coupling; reducing an axial force between the energy converter and each of the upper body portion and the lower body portion; removing the energy converter; arranging a replacement energy converter between the upper body portion and the lower body portion; attaching the replacement energy converter to the upper body portion and the lower body portion by means of the first releasable mechanical coupling and the second releasable mechanical coupling; increasing an axial force between the energy converter and each of the upper body portion and the lower body portion; detaching and removing the holding arrangement.

Before removing the energy converter, the axial force is reduced sufficiently to allow removal. Advantageously, the compressive force acting on the energy converter resulting from the mass of the upper body portion may be reduced to zero or close to zero before the energy converter is removed.

The steps of the methods according to various embodiments of the present invention need not necessarily be performed in any particular order. For instance, the axial force between the energy converter and each of the upper and lower body portions may be increased before the replacement energy converter is attached to the upper and lower body portions.

It should also be noted that the replacement energy converter may be a different energy converter or the same energy converter that was previously removed following maintenance, such as replacement of parts.

The energy converter may advantageously be removed by, at least initially, displacing the energy converter in a direction substantially perpendicular to the longitudinal axis of the wind turbine body.

Furthermore, the floating wind energy harvesting apparatus may comprise a braking arrangement for substantially preventing rotation of the wind turbine body, and the method may further comprise the step of controlling the braking arrangement to prevent rotation of the wind turbine body before attaching the holding arrangement to the upper body portion and to the lower body portion.

It should be understood that the wind turbine body may rotate slowly even though the braking arrangement is activated.

According to various embodiments, the method of the present invention may further comprise the steps of providing a floating vessel carrying the holding arrangement and the replacement energy converter; and maneuvering the vessel, in relation to the wind turbine body, in such a way that the holding arrangement becomes arranged between the upper body portion and the lower body portion. In other words, a floating vessel may suitably dock with the wind turbine body before replacing the energy converter.

The axial force between the upper and lower body parts and the energy converter may advantageously be temporarily reduced by heating the holding arrangement and/or cooling the energy converter. Alternatively, or in combination, the holding arrangement may comprise a lifting arrangement, which may, for example, utilize hydraulics for lifting the upper body portion.

In summary, according to various embodiments the present invention relates to a floating VAWT comprising a wind turbine body having a lower body portion and an upper body portion; at least one blade attached to the upper body portion for converting wind energy to rotation of the wind turbine body; and an energy converter attached to the wind turbine body for converting the rotation of the wind turbine body to electrical energy. The energy converter comprises a first energy converter part, and a second energy converter part to be kept relatively stationary in relation to the first energy converter part. The energy converter is attached to the wind turbine body by means of a first releasable mechanical coupling between the first energy converter part and the lower body portion of the wind turbine body, and a second releasable mechanical coupling between the first energy converter part and the upper body portion of the wind turbine body.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1:
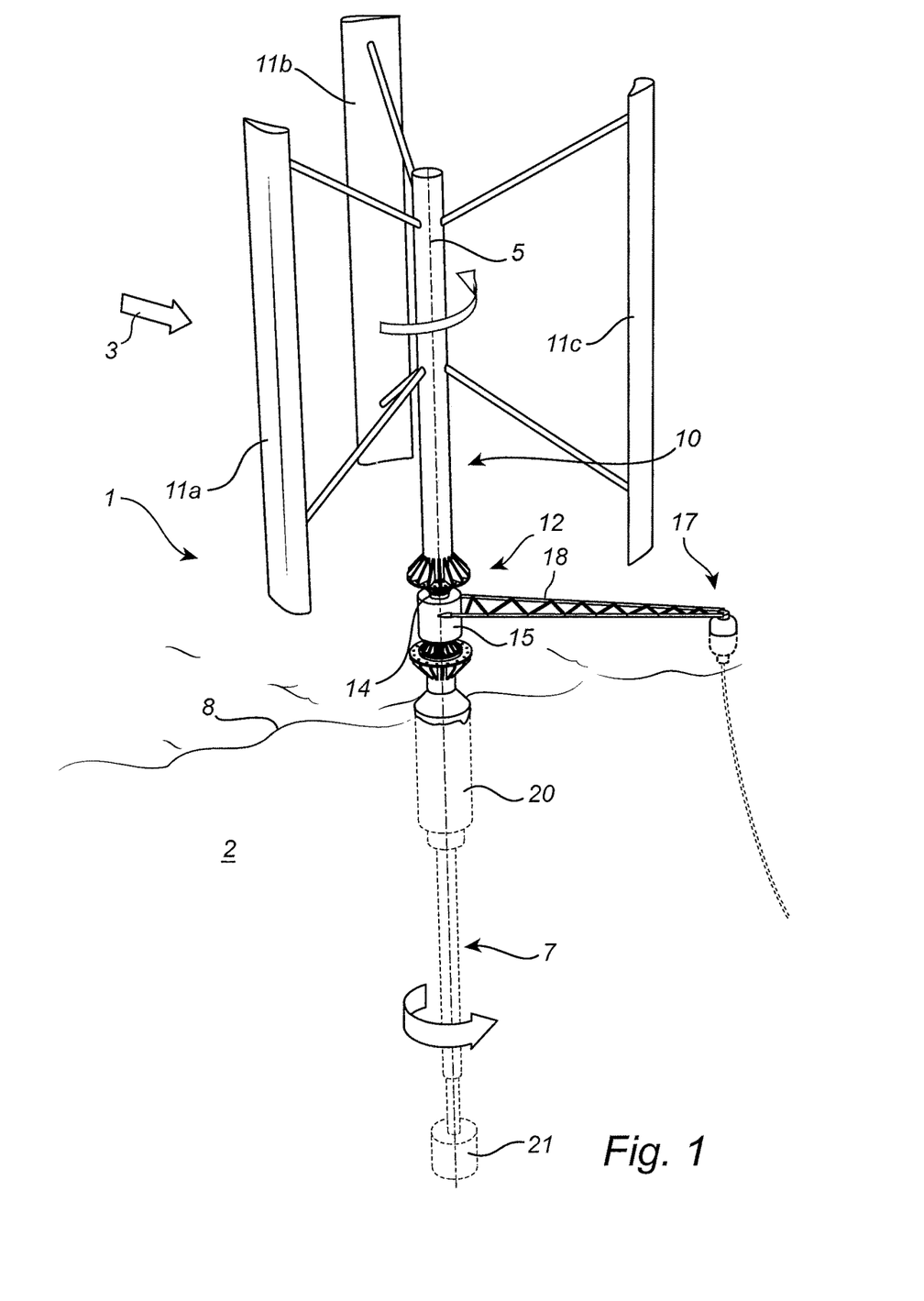
FIG. 1 is a schematic perspective view of a floating wind energy harvesting apparatus according to an example embodiment of the present invention.

FIG. 1 schematically illustrates a floating wind energy harvesting apparatus in the form of a floating vertical axis wind turbine (VAWT) 1. In FIG. 1, the VAWT 1 is shown floating in the sea 2 and being exposed to wind 3.

Referring to FIG. 1, the VAWT 1 comprises an elongated wind turbine body extending along a longitudinal wind turbine body axis 5. As is schematically indicated in FIG. 1, the wind turbine body comprises a lower body portion 7 mainly arranged below the water surface 8, and an upper body portion 10 mainly arranged above the water surface 8. The VAWT 1 further comprises blades 11a-c attached to the upper body portion 10, and an energy converter 12 attached to the wind turbine body between the lower body portion 7 and the upper body portion 10.

As will be described below in further detail, the energy converter 12 comprises a first energy converter part 14 and a second energy converter part 15. The first energy converter part 14 is releasably mechanically coupled to the lower body portion 7 and the upper body portion 10 to rotate around the longitudinal wind turbine body axis 5 together with the lower 7 and upper 10 body portions. The second energy converter part 15 is coupled to an anchoring arrangement 17 via arm 18 to keep the second energy converter part 15 relatively stationary in relation to the first energy converter part 14.

As is schematically shown in FIG. 1, the lower body portion 7 comprises a buoyancy-providing portion 20 and a ballast portion 21 that are dimensioned to keep the VAWT 1 generally vertical and the energy converter 12 above the water surface 8.

The buoyancy-providing portion 20 may comprise a foam-filled space, making the VAWT 1 unsinkable, and a reservoir (not shown) for allowing control of the buoyancy of the VAWT 1. The reservoir may be controllably filled with water to control the level of the VAWT 1 to compensate for factors such as variations in the salt concentration in the water and organic growth on the lower body portion 7.

When the wind 3 blows as is schematically indicated in FIG. 1, the forces resulting from the interaction between the wind and the blades 11a-c cause the wind turbine body to rotate around the longitudinal axis 5. This in turn results in rotation of the first energy converter part 14 in relation to the second energy converter part 15. This relative rotation is converted to electrical energy.

Most parts of the VAWT 1 in FIG. 1 may be robust and can be made from relatively cheap and sturdy materials, such as steel and concrete, and will not be moving when in contact with anything but air or water. Therefore, most parts of the VAWT 1 are likely to be operational during the entire lifetime of the VAWT 1. However, the energy converter 12 may need maintenance or replacement at least at some time during the lifetime of the VAWT 1.

To facilitate maintenance or replacement of the energy converter 12, the first energy converter part 14 is, as was described above, releasably mechanically connected between the lower body portion 7 and the upper body portion 10.

An example of the configuration of the energy converter 12 and the mechanical connection between the energy converter 12 and the lower 7 and upper 10 body parts will now be described with reference to FIG. 2.

Figure 2:
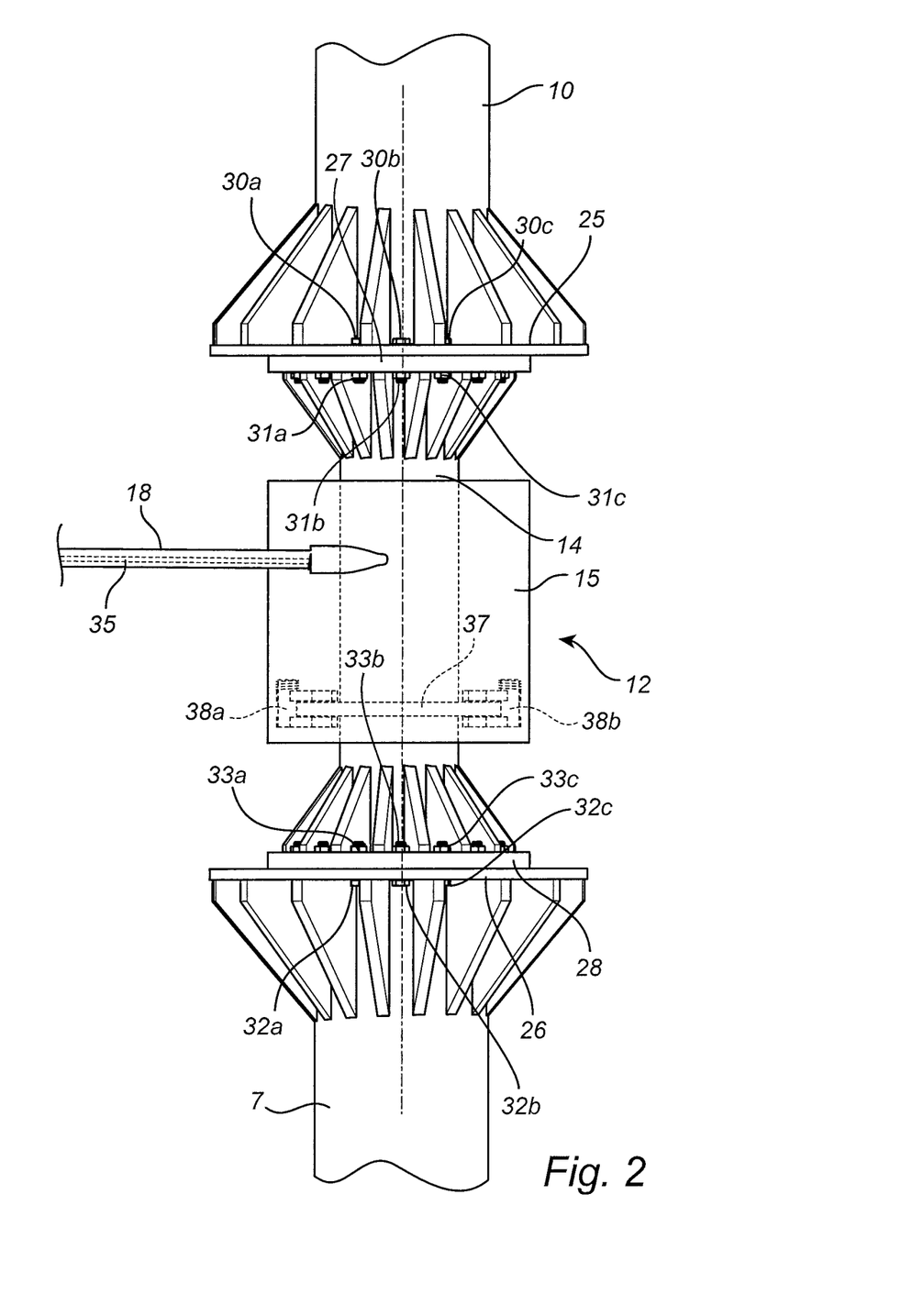
FIG. 2 is an enlarged view of the energy converter comprised in the wind energy harvesting apparatus in FIG. 1 and the connection between the energy converter and the lower and upper wind turbine body portions.

As can be seen in FIG. 2, the upper body portion 10 comprises a first body flange 25, the lower body portion 7 comprises a second body flange 26, and the first energy converter part 14 comprises a first energy converter flange 27 and a second energy converter flange 28.

The first body flange 25 is releasably connected to the first energy converter flange 27 by means of releasable fasteners, here in the form of bolts 30a-b and nuts 31a-b (all bolts and nuts are not visible in FIG. 2). In the same way, the second body flange 26 is releasably connected to the second energy converter flange 28 by means of bolts 32a-c and nuts 33a-c (all bolts and nuts are not visible in FIG. 2).

As is schematically indicated in FIG. 2, the energy converter 12 comprises electrical wiring 35 for conducting electrical current generated by the energy converter 12 from the second energy converter part 15 to a remote location.

Moreover, the energy converter 12 comprises a braking arrangement including a disc 37 attached to the first energy converter part 14, and brake calipers 38a-b attached to the second energy converter part 15. The brake calipers 38a-b are controlled by control circuitry (not shown in FIG. 2) included in the energy converter 12.

Having now described an example embodiment of the floating wind energy harvesting apparatus according to the present invention, a maintenance method according to an embodiment of the present invention will now be described with reference to the flow-chart in FIG. 3 and the illustrations in FIGS. 4a-b and FIG. 5, and continued reference to FIG. 1 and FIG. 2 where applicable.

In a first step 100, a specialized maintenance vessel docks with the VAWT 1. Referring to FIGS. 4a-b, an exemplary maintenance vessel 40 has an opening 41, a holding arrangement 42, and a crane 43 for allowing safe docking with the VAWT 1 and replacement of the energy converter 12. On the deck the vessel 40 carries replacement energy converters 45a-b.

To be able to dock the vessel 40 with the VAWT 1, the rotation of the VAWT 1 is first stopped by wirelessly sending a signal to the control unit comprised in the energy converter 12 to brake the VAWT 1 by actuating the brake calipers 38a-b. Thereafter, the vertical level of the vessel 40 is controlled using tanks (not shown in FIGS. 4a-b) in the vessel 40 to align the holding arrangement 42 with the first 25 and second 26 body flanges of the VAWT 1.

Figure 4A:
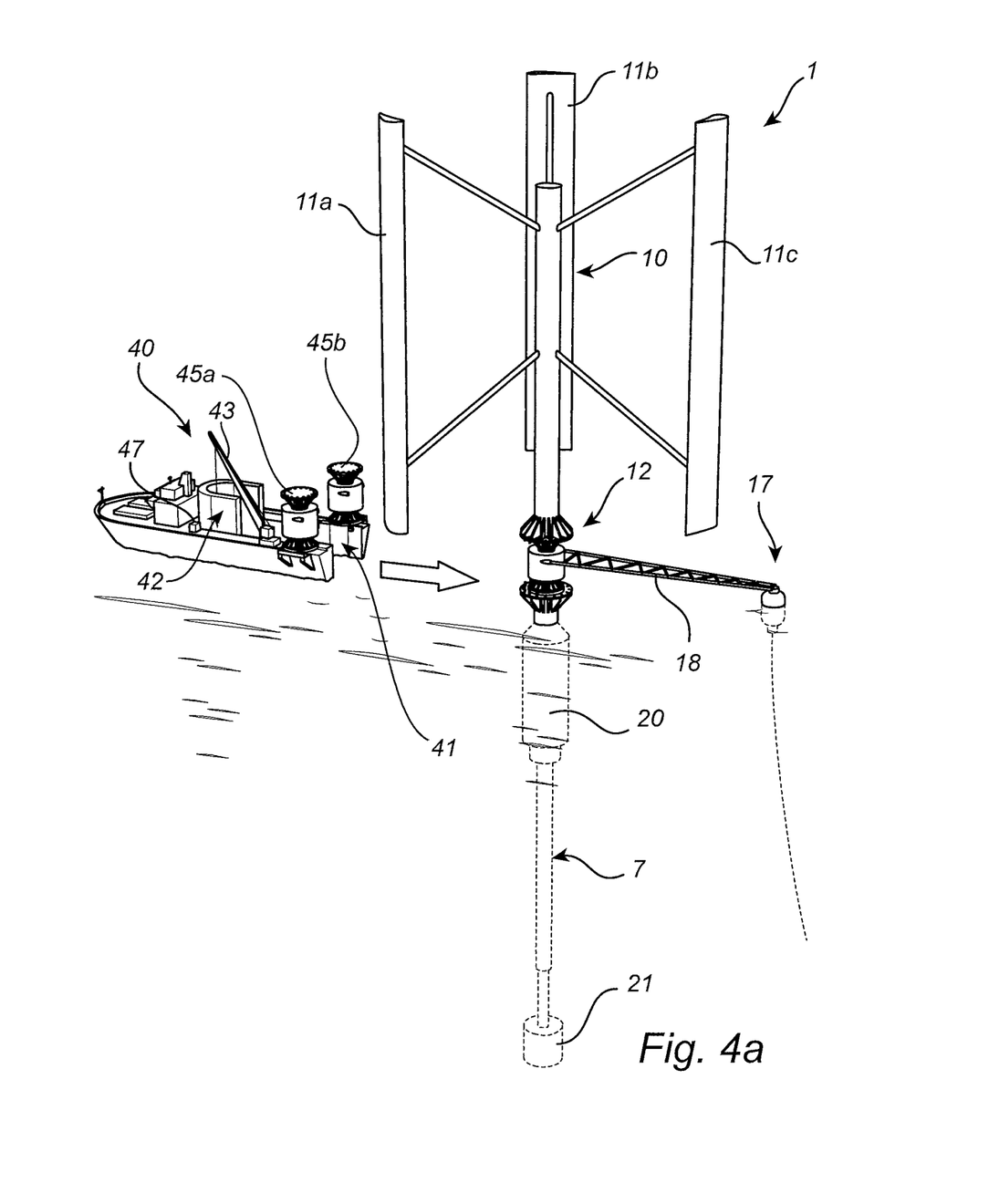
FIGS. 4a-b schematically shows an example of a floating vessel that may be used when carrying out the method of the flow-chart in FIG. 3.
Figure 4B:
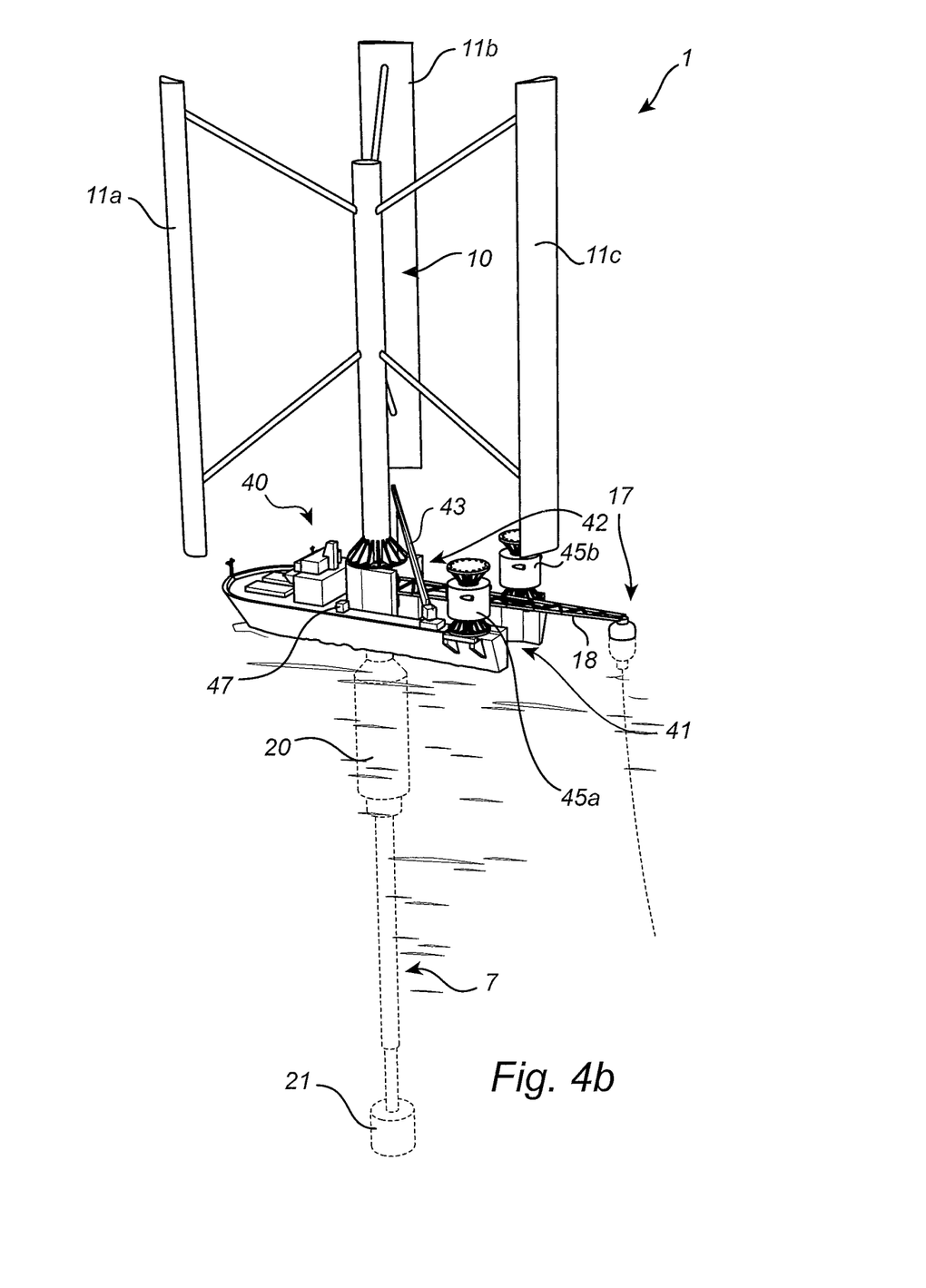
Figure 5:
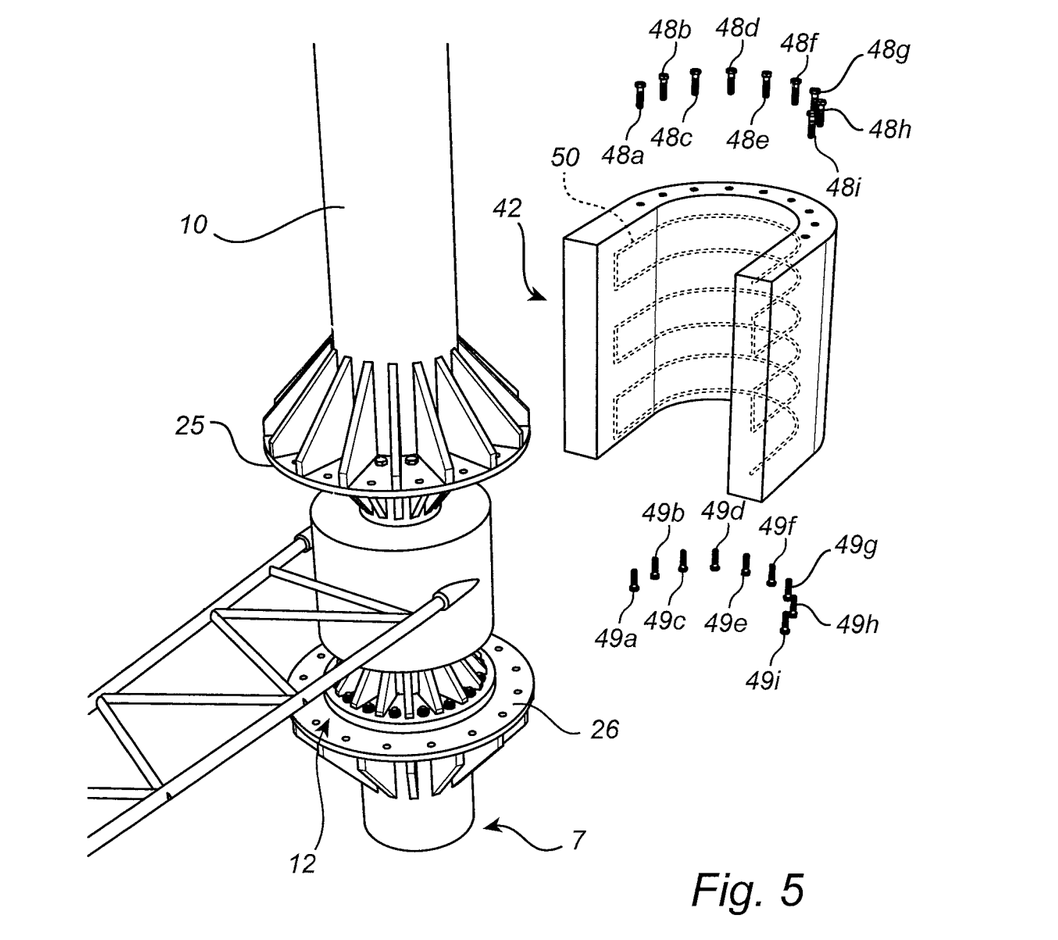
FIG. 5 is a perspective view schematically illustrating the attachment of the holding arrangement to the wind turbine body prior to removing the energy converter.

The holding arrangement 42 is configured to allow temporary attachment to the lower 7 and upper 10 body portions of the VAWT 1, and, although not visible in FIGS. 4a-b, additionally comprises channels for circulating hot fluid in the interior of the holding arrangement 42 to expand the holding arrangement. As is schematically indicated in FIGS. 4a-b, the vessel 40 comprises a heating arrangement 47 for heating the fluid circulating in the interior of the holding arrangement 42.

Figure 3:
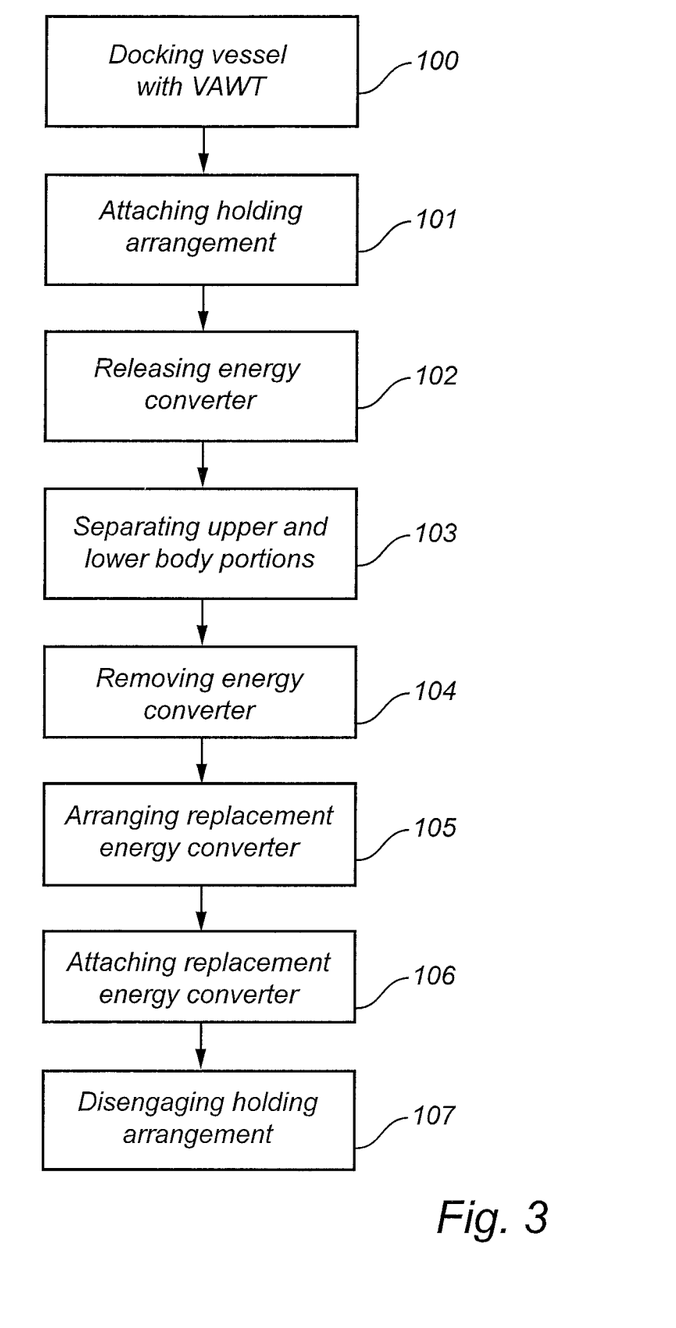
FIG. 3 is a flow-chart schematically illustrating an example embodiment of the method according to the present invention.

Returning to the flow-chart in FIG. 3, the holding arrangement 42 is attached to the lower 7 and upper 10 wind turbine body parts in step 101. As is schematically indicated in FIG. 5, the holding arrangement 42 is connected to the first body flange 25 using bolts 48a-i and to the second body flange 26 using bolts 49a-i. The above-mentioned channels 50 are schematically indicated in FIG. 5.

It may be convenient to first arrange the holding arrangement 42 between the lower 7 and upper 10 body portions with some play, and then heat the holding arrangement to bring it in contact with the first 25 and second 26 body flanges. Thereafter, the upper 48a-i and lower 49a-i sets of bolts can be tightened.

In the next step 102, the energy converter 12 is released by removing the bolts 30a-c, 32a-c and nuts 31a-c, 33a-c attaching the energy converter 12 to the upper 10 and lower 7 body portions.

Thereafter, in step 103, the lower 7 and upper 10 body portions are separated by operating the heating arrangement 47 to circulate more hot fluid through the channels 50 in the holding arrangement 42. After the holding arrangement has expanded, the energy converter 12 is removed in step 104 using the crane 43, and placed on the deck of the vessel 40.

Subsequently, in step 105, a replacement energy converter 45a is arranged between the lower 7 and the upper 10 body portions using the crane 43.

The replacement generator 45a is attached to the lower 7 and upper 10 body portions in step 106, and the holding arrangement is then disengaged in step 107 by removing the upper 48a-i and lower 49a-i sets of bolts and allowing the holding arrangement to cool down (or actively cooling the holding arrangement) and moving the vessel 40 away from the VAWT 1.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A floating wind energy harvesting apparatus for offshore installation, said wind energy harvesting apparatus comprising:
   an elongated wind turbine body extending along a longitudinal wind turbine body axis, said wind turbine body comprising a lower body portion to be mainly below a water surface when the wind energy harvesting apparatus is in operation and an upper body portion to be mainly above the water surface when the wind energy harvesting apparatus is in operation;
   at least one blade attached to the upper body portion for converting wind energy to rotation of the wind turbine body around the longitudinal wind turbine body axis; and
   an energy converter attached to said wind turbine body for converting the rotation of said wind turbine body to electrical energy,
   said energy converter comprising a first energy converter part coupled to said turbine body for rotating in response to rotation of said wind turbine body, and a second energy converter part to be kept relatively stationary in relation to said wind turbine body, the resulting rotation of said first energy converter part in relation to said second energy converter part being converted to electrical energy by said energy converter,
   wherein said energy converter is attached to said wind turbine body by means of a first releasable mechanical coupling between said first energy converter part and said lower body portion of the wind turbine body, and a second releasable mechanical coupling between said first energy converter part and said upper body portion of the wind turbine body.

2. The floating wind energy harvesting apparatus according to claim 1, wherein said floating wind energy harvesting apparatus is configured in such a way that said energy converter is arranged above the water surface when the wind energy harvesting apparatus is in operation.

3. The floating wind energy harvesting apparatus according to claim 1, wherein:
   said upper body portion comprises a first body flange;
   said lower body portion comprises a second body flange;
   said first energy converter part comprises a first energy converter flange and a second energy converter flange; and
   said first body flange is releasably connected to said first energy converter flange, and said second body flange is releasably connected to said second energy converter flange.

4. The floating wind energy harvesting apparatus according to claim 3, wherein:
   said first body flange is releasably connected to said first energy converter flange by means of a first releasable fastening arrangement; and
   said second body flange is releasably connected to said second energy converter flange by means of a second releasable fastening arrangement.

5. The floating wind energy harvesting apparatus according to claim 4, wherein each of said first and second releasable fastening arrangement comprises a plurality of bolts and corresponding nuts.

6. The floating wind energy harvesting apparatus according to claim 3, wherein at least one of said first body flange and said second body flange comprises:
   a first set of holes for releasable attachment of said energy converter to said wind turbine body; and
   a second set of holes for temporary releasable attachment of a wind turbine body holding arrangement to said wind turbine body between said first body flange and said second body flange.

7. The floating wind energy harvesting apparatus according to claim 1, wherein said energy converter further comprises:
   a braking arrangement mechanically coupled to said first energy converter part and to said second energy converter part; and
   processing circuitry for controlling said braking arrangement to reduce a rotational speed of said first energy converter part in relation to said second energy converter part.

8. A method of replacing the energy converter of the floating wind energy harvesting apparatus according to claim 1, said method comprising the steps of:
   attaching a holding arrangement to said upper body portion and to said lower body portion, said holding arrangement being arranged and configured to maintain a relative arrangement of said upper body portion and said lower body portion;
   releasing said first releasable mechanical coupling and said second releasable mechanical coupling;
   reducing an axial force between said energy converter and each of said upper body portion and said lower body portion;
   removing said energy converter;
   arranging a replacement energy converter between said upper body portion and said lower body portion;
   attaching said replacement energy converter to said upper body portion and said lower body portion by means of said first releasable mechanical coupling and said second releasable mechanical coupling;
   increasing an axial force between said energy converter and each of said upper body portion and said lower body portion;
   detaching and removing said holding arrangement.

9. The method according to claim 8, wherein said energy converter is removed by, at least initially, displacing said energy converter in a direction substantially perpendicular to the longitudinal axis of said wind turbine body.

10. The method according to claim 8, wherein said floating wind energy harvesting apparatus comprises a braking arrangement for substantially preventing rotation of said wind turbine body,
   said method further comprising the step of:
   controlling said braking arrangement to prevent rotation of said wind turbine body before attaching said holding arrangement to said upper body portion and to said lower body portion.

11. The method according to claim 8, further comprising the steps of:
   providing a floating vessel carrying said holding arrangement and said replacement energy converter; and
   maneuvering said vessel, in relation to said wind turbine body, in such a way that said holding arrangement becomes arranged between said upper body portion and said lower body portion.

12. The method according to claim 8, wherein said step of reducing said axial force comprises the step of:
   heating said holding arrangement to expand said holding arrangement.

13. The method according to claim 8, wherein said step of reducing said axial force comprises the step of:
   cooling said energy converter to contract said energy converter.

* * * * *